Dec. 16, 1969 J. W. WEIGL 3,484,793

IMAGE RECORDING APPARATUS INK DROPLET RECORDER WITH OPTICAL INPUT

Filed May 2, 1966 3 Sheets-Sheet 1

INVENTOR.
JOHN W WEIGL

BY Anthony D. Cennamo
Daniel Rubin

ATTORNEYS

INVENTOR.
JOHN W WEIGL
BY Anthony A. Cannamo
Daniel Rubin
ATTORNEYS

INVENTOR.
JOHN W. WEIGL
BY [signatures]
ATTORNEYS

United States Patent Office
3,484,793
Patented Dec. 16, 1969

3,484,793

IMAGE RECORDING APPARATUS INK DROPLET RECORDER WITH OPTICAL INPUT

John W. Weigl, West Webster, N.Y., assignor to Xerox Corporation, Rochester, N.Y., a corporation of New York Filed May 2, 1966, Ser. No. 546,998
Int. Cl. G01d *15/18*
U.S. Cl. 346—75 8 Claims

ABSTRACT OF THE DISCLOSURE

An ink recording system wherein electrically conductive ink droplets can be selectively deflected through a trajectory onto a recording surface as a function of intelligence signals in the form of optical or electronic radiation.

This invention relates to apparatus for image recording of information. More specifically, the invention relates to a facsimile or similar image recording system for liquid ink recording of intelligence signals transmitted as optical radiation.

Prior art devices for recording with liquid ink are generally of three basic types. The first type operates with physical contact between an ink-fed stylus and a recording surface with the stylus being physically removable from the recording surface on receipt or absence of an appropriate signal. Handicaps of this system include difficulty associated with physical removal of the stylus under varying conditions of operation. At high operating speeds, such as is associated with a fast flow of intelligence, a highly damped, relatively non-elastic mechanical system is required and which becomes impractical or impossible to construct. The large amount of distortion-free power required to operate such a system at speeds of 10 kc. s. or higher results in high initial cost and a very low level of operating efficiency.

A second of the prior existing types for liquid ink recording is one in which an ink-fed stylus is maintained in constant contact against a recording sheet and is moved relative thereto in order to record information. Like the last mentioned type, this provides a continuous mark on the recording surface at all times when the stylus and recording surface are in contact. This type had been largely limited in practical applications to oscillograph use since mechanical complexity had been regarded as too prohibitive to control a continuously marking stylus for the tortuous configurations necessary for more sophisticated writing.

The last of the aforementioned types is referred to as "ink spitters" and includes devices in which ink is transferred across a gap from a point or orifice onto a recording surface. They are generally responsive to an intermittently applied electrical signal or a control pressure in the feed system. In those systems responsive to receipt of a voltage signal, it has been necessary to intermittently generate these signals of high enough voltage sufficient to overcome the inertia and surface tension effects associated with the ink in its capillary. This has been found extremely difficult at high frequency rates and has imposed operating limits on the use of these devices.

Now in accordance with the present invention, there is provided an image ink recording system in which a continual flow of uniformly formed ink droplets can be selectively deflected in a trajectory to or away from a recording surface in response to signals of intelligence in the form of optical radiation. The signal can be transmitted directly as from graphic information by reflex, optical light pipes, or the like, or transduced from other forms of energy such as electrical signals, sonic, or the like. Since individual droplets have a signal dependent trajectory, ink deposited onto the printing surface may be selectively interrupted at a very high rate in direct response to the received optical signals. By this means, employing an array of droplet streams closely spaced, each in a trajectory similarly responsive, there is enabled a quality system for recording of half tone, line copy, or the like, transmitted initially as intelligence by whatever form including well-known systems of facsimile transmission.

This is achieved in accordance with the invention by apparatus providing for a flow of ink droplets ejected continuously in uniform formation from a linear array of separate, closely-spaced nozzles under the influence of steady or pulsed pressure and optionally modulated by mechanical vibration, ultrasonic oscillation, or the like, and from which the droplets are directed generally towards a print receiving surface on which a recording is to be made. To receive the optical signals, there is included for association with each droplet stream a voltage connected photoconductive element or a selected portion of a much broader photoconductor from which an electrode extends juxtaposed to the passing droplets. A light or radiation exposure of information to the photoconductive element produces a potential on its electrode to induce a field condition acting on those selective droplets passing the electrode at that moment in time. In one embodiment hereof, each emitted droplet received a uniform charge prior to passing this latter electrode which then is effective to selectively deflect those droplets acted upon. In another embodiment, the electrode serves to selectively charge those droplets acted upon and which then separate from the others as all droplets pass through a constant deflection field. Whichever embodiment is employed, the result is to effect only information droplets being directed onto the recording surface.

It is accordingly an object of the present invention to provide novel method and apparatus for ink recording of information.

It is another object of the invention to provide novel method and apparatus for ink recording of information intelligence received in the form of optical radiation.

It is a still further object of the invention to provide novel method and apparatus for image recording with liquid ink ejected as droplets selectively controlled by differentiating electrostatic fields generated in response to optical radiation.

Further objects and features of the present invention will become apparent from the following detailed description when taken in conjunction with the drawings in which.

Figure 1:
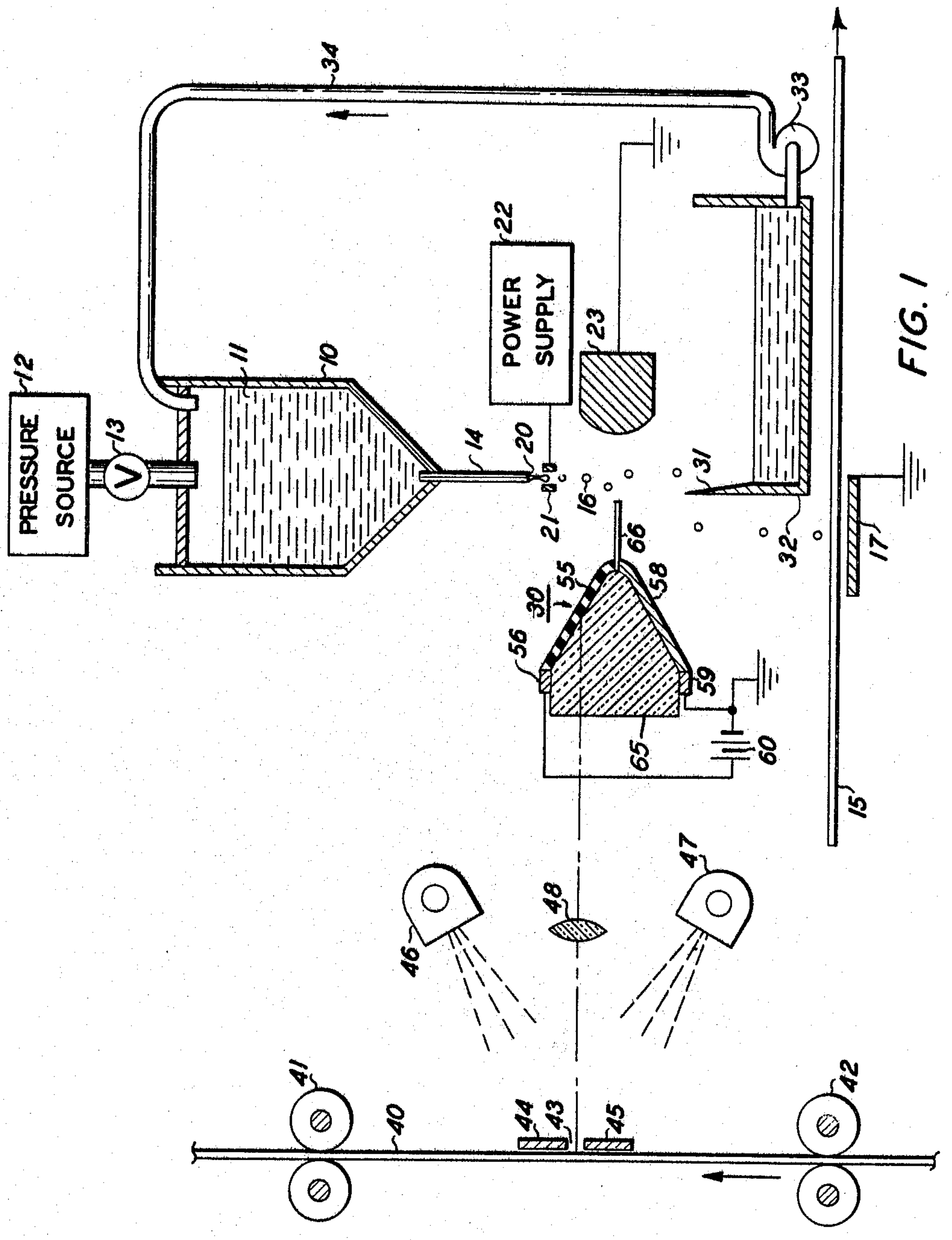
FIG. 1 is a schematic sectional elevation of a recording system of a first embodiment thereof.
Figure 2:
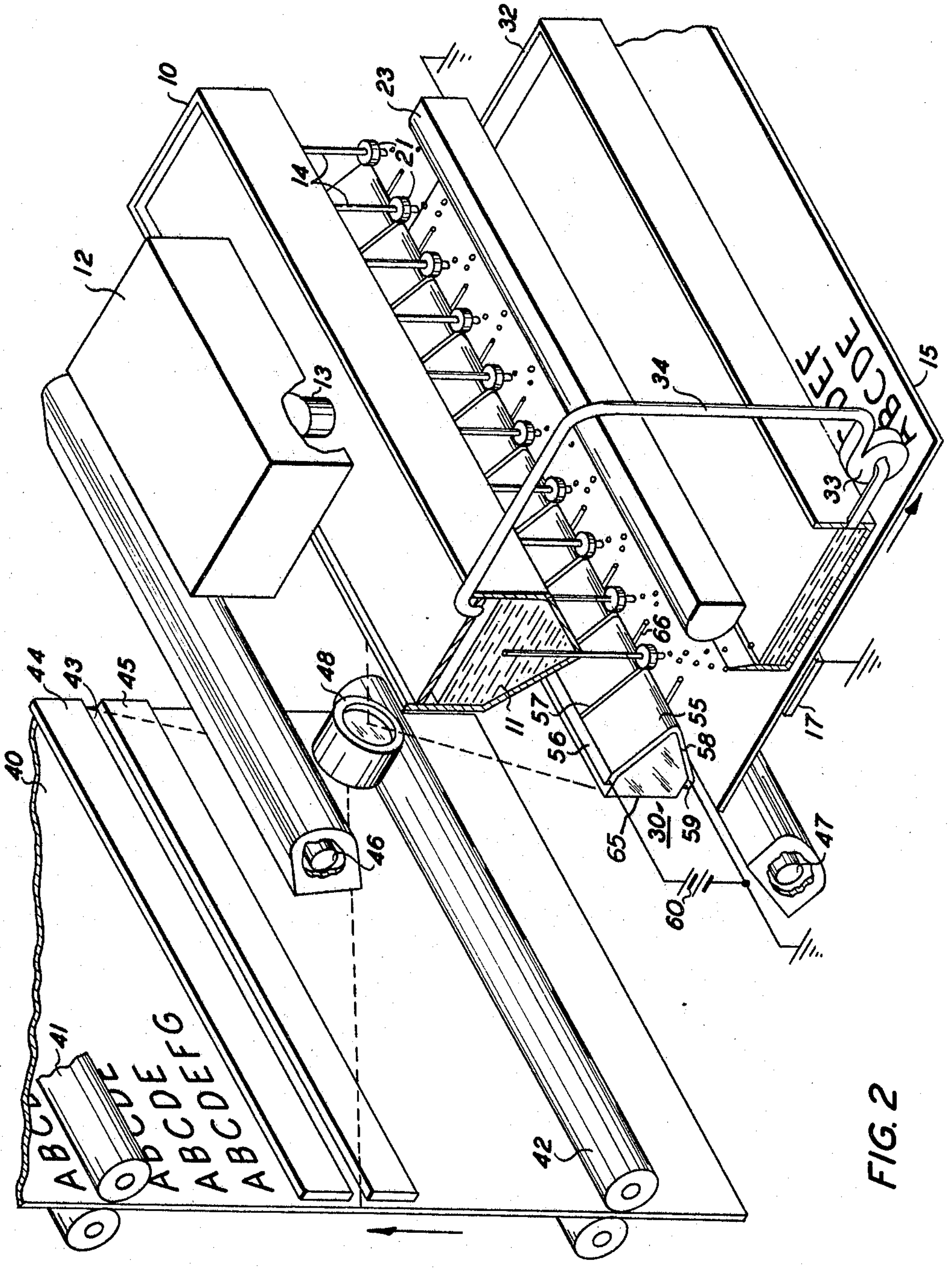
FIG. 2 is an isometric illustration of the complete system illustrated in FIG. 1.

Referring now to the embodiments shown in FIGS. 1 and 2, the apparatus includes an elongated ink reservoir 10 containing a quantity of liquid recording ink 11 which is slightly or highly electrically conductive. During operation of the system, as will be understood, the ink is maintained under a flow pressure from a source 12 operating through an automatic valve 13. The reservoir tapers to a "V" at its lower portion through which there extends an array of closely-spaced capillaries or nozzles 14 extending parallel and coterminous and from which ink can be ejected in response to pressure applied from source 12. The nozzles are arranged so that the formed droplets 16 during system operation continuously emanate therefrom and are directed generally toward a recording member 15 below as the latter passes over a grounded platen 17.

The specific technique by which the droplets are formed does not per se comprise the invention hereof, it being sufficient to say that reasonable or substantial uniformity of mass and shape is preferable for subsequent and most dependable operation. Consequently, although pressure nozzle ejection is being described, any of various suitable techniques can be employed including ultrasonic vibration, or the like, as for example disclosed in copending applications Ser. No. 398,655 and Ser. No. 398,589 filed Sept. 23, 1964. In accordance with the embodiment illustrated, the pressure source 12 is connected selectively via a control valve 13 and is of sufficient magnitude to induce a flow of uniform droplets 16 emitted through an orifice 20 at the end of capillary 14. The valve is also operative to bleed the applied pressure at such time as the system is inoperative as during normal shutdown.

Ink 11 is therefore forced into each of the capillaries under pressure generated from the pressure source. Pressures generally in the range of at least 10 p.s.i. work well. As can be appreciated, the preferred pressures will vary depending largely upon the conductivity and viscosity of the ink, the desired speed of printing, as well as the size and shape of the orifice 20. In one suitable embodiment, the lower end of the capillary just preceding the orifice comprises a generally conical cross-section converging to the orifice which may be circular and may, for example, be about 0.0015 inch in diameter. Both the capillary and the orifice thereof may likewise be of other suitable symmetric or asymmetric design.

In accordance with the embodiment of FIGS. 1 and 2, each of the droplets receives a predetermined and defined potential at or about the position at which they are formed on leaving the orifice 20. Generally, this occurs just at the end of the continuous jet emerging from the nozzle, at the point where the droplets are separating. For applying the potential there is included, extending about the jet stream at this point, an electrode collar 21 connected to a power supply 22. By this means each and every droplet receives a potential of uncritical magnitude and which for example can be on the order of approximately 100 to 1000 volts. As the charged droplets thereafter continue their trajectory towards recording surface 15, the stream passes a photoelectrically controlled lateral deflection field selectively actuated in response to information and applied transverse to the path of the steadily flowing ink droplets. In this embodiment, the selectively applied field acts to deflect those droplets selectively acted upon into a separate trajectory apart from those droplets not acted upon. As will be understood, only those droplets consistently representing received information intelligence or consistently representing the absence thereof contained as one of the trajectories deposit onto the surface of recording sheet 15.

In order to produce the desired deflection field in response to graphic information on a document original 40 as shown, the document is steadily advanced uniformly via feed roll pairs 41 and 42 past an exposure slit 43 formed of parallel plates 44 and 45. As the document advances past the slit, the document area thereat is illuminated by a pair of shielded lamps 46 and 47 extending at least the document width. That portion of the document beneath the slit is then reflected into an objective lens 48 which projects the moving image onto an image bar imaging electrode unit 30 in accordance with the invention.

The imaging electrode 30 is supported opposite a fixed and grounded counterelectrode 23 and serves to laterally deflect selective ink droplets as aforesaid into a different trajectory as they travel to therebetween in their trajectory emanating from nozzle 14. Imaging electrode 30 and opposite aligned counterelectrode 23 extend transversely uniformly spaced from the capillary array. The imaging electrode as shown comprises an integral structure of separate units each independently operative in association with the capillary with which it is aligned, but coupled and joined commonly to form a composite structure. Each unit, as can be seen on the drawings in FIG. 2, consists of an angularly disposed strip 55 of a photoconductive material such as vitreous selenium, evaporated cadmium sulphide, phthalocyanine, or cadmium sulfoselenide in a resin binder optionally separated from its adjacent counterpart by means of a thin insulating strip 57, and connected at one end to a common conductor bar 56 spanning all of the individual units. The lower section of each unit is formed of a matching load resistor 58 and a conductor bar 59 similar to bar 56 which are connected through a voltage source supplied from a battery 60 in series with conductor 56. Alternatively, as described above, separate units need not be required, and selectively actuated portions of a broad area photoconductor could be used.

The reflection of copy sheet 40 received via lens 48 and representing the unimaged background areas thereof is directed to impinge on photoconductor strip 55 either directly or by passing through transparent backing member 65 which provides structural support to the imaging electrode 30. As strip 55 becomes illuminated, its conductivity is increased permitting a potential to appear at the junction with resistor 58 and at which there is a fine, elongated electrode 66 extending toward the counterelectrode close to the ink stream trajectory. Electrode 66 can suitably comprise a fine wire. The potential at the end of electrode 66 provides a deflecting field as aforesaid to the previously charged droplets moving therepast at that moment in time to effect a separate trajectory for those deflected droplets an opposed to those droplets undeflected. Each electrode 66 in the trray therefore is capable in response to illumination from copy 40 of selectively effecting a division of the droplets in its associated stream into trajectories which carry them either onto recording surface 15 or into a sump 32 having an upwardly extending knife edge 31 to ensure droplet interception. From the sump the surplus ink is returned to the reservoir 10 by means of a circulating pump 33 connected to a conduit 34 which discharges into the reservoir.

Since each electrode 66 is energized in response to radiation originating from copy original 40, the end result on recording surface 15 is to effect a like image duplication thereof or a complementary duplication thereof depending on whether the undeflected or deflected droplets, respectively, reach the recording surface. That is, where the illuminated or background areas of original 40 (of black characters on a white background) produce a potential at the ends of electrodes 66 to deflect those droplets affected thereby toward the recording surface, the deposit of ink droplets thereon will, with a dark-colored ink on a white recording surface, appear photographically negative in relation to the original being duplicated. Where the oppoiste or other droplet trajectory reaches the recording surface, or where the ink contrasts with the recording surface by being of a lighter color than the recording sheet, a like image of the original will result. Accordingly, it should be obvious that the system can be adjusted to be either positive or negative working simply depending on whether the droplets normally impinge upon the record sheet or are diverted away therefrom in response to the deflecting field. It should likewise be apparent that the latter choice depends also upon whether the photoconductive control elements 55 are connected to the plus or negative voltage side of power source 60 in relation to the constant field at counterelectrode 23. This will make the deflection effect toward or away from electrode 66 dependent on the polarity of prior droplet charge.

Figure 3:
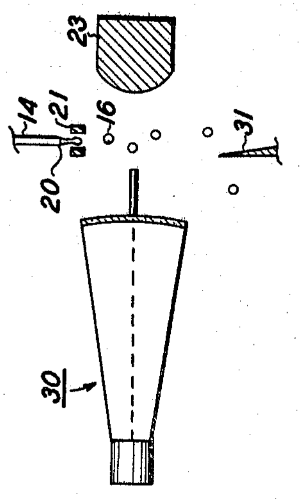
FIG. 3 is a non-optical variation of the recording system as can be substituted in FIG. 1; and, FIG. 4 is a sectional elevation of a recording system of a second embodiment hereof.

In the embodiment shown in FIG. 3, there is disclosed a non-optical system in which the imaging electrode 30 comprises a pin-type CRT including an array of pin electrodes 66 extending linearly as described above. An electron beam directed against selective of the pins causes deflection of selective droplets from the associated droplet trajectory such that the droplets 16 can be divided between recording surface 15 and return sump 32 similarly as above. By this means, a pin-tube is used to apply a deflecting field acting on the droplets, without the intervention of a photoconductor array.

Figure 4:
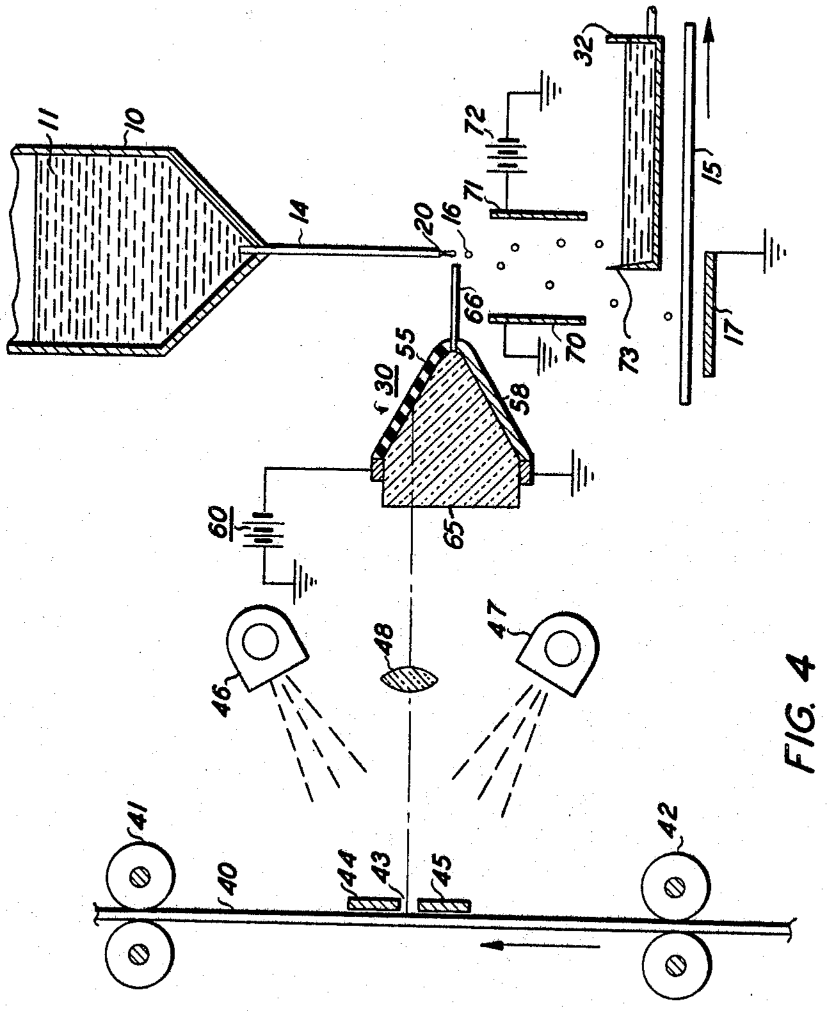

In the embodiment shown in FIG. 4, a continuous jet of ink droplets 16 emerge from each nozzle 14 essentially uncharged. Electrodes 66 are placed near the point where the continuous jet separates into droplets. A voltage imposed on electrode 66 via photoconductive element 55, from source 60, charges all droplets which separate from the continuous jet during the time that the voltage is present. The charge on each charged droplet is approximately proportional to the magnitude of the voltage present at electrode 66 at the instant the droplet separates from the continuous jet. All the droplets then pass through a constant transverse deflection field imposed by a pair of parallel plates 70 and 71, each on an opposite side of the trajectory and to which a high voltage D.C. potential is applied from source 72. The charged droplets on passing through this field are thereby separated from the uncharged droplets into a different trajectory, one of which deposits onto the surface of recording sheet 15 as before. The remaining droplets are intercepted by a trough 73 for delivery to sump 32. Accordingly, the droplet passing the electrode 66 while the photoconductor is illuminated receives an induced charge, of typically 100 volts. By reversing polarity of the supply voltage from source 60, or at source 72, the system can be operative to produce either negative or positive copy.

The ink employed herein must be sufficiently conductive such that all droplets arrive at an equilibrium potential quickly as compared to the time they spend in the conductive capillary 14. Dye solutions and pigmented inks may be used, as well as aqueous solutions of color formers or color forming catalysts (for use with, e.g., diazo coated paper), emulsions of resins which can be dried to oil wettable patterns (for recording on direct-image litho plates or the like), and the like. It is essential further that the ink be capable of being formed into a narrow stream of continuous droplets as the streams emerge from a uniformly arranged capillary array.

The capillary should, at least for the embodiment of FIGS. 1 and 2, be electrically conductive so as to be capable of placing the droplets emanating at a well-defined potential by means of the electrode collar thereabout. Obviously, droplet flow must be uniform and in its average transmission, droplet size should preferably be as narrow as the finest element of print to be resolved. Some control over the droplet size can be effected by utilizing a long nozzle having a fine screen at the orifice outlet.

By the above description, there has been disclosed a novel system for liquid ink recording of information in response to intelligence thereof received in the form of optical radiation. The system is highly responsive in the reproduction of copy whether from direct imaging from an original, or otherwise transmitted as by facsimile and subsequently transduced to optical information. Whatever original energy form, it can ultimately be utilized herein for the reproduction of copy.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A system for the recording of intelligence information comprising:

(a) a source of radiation signals representative of information intelligence;

(b) means to support a copy sheet on which information intelligence from said source is to be recorded;

(c) droplet producing means to produce a steady flow of electrically conductive ink droplets in a trajectory leading generally toward the copy sheet on said support;

(d) radiation responsive electrodes means supported stationary in field relation to the droplets in said trajectory to receive information from said source in the form of said radiation signals and in response to a receipt thereof to electrically distinguishably affect the droplets moving therepast for the duration of the received signal said radiation responsive electrode means being a unitary structure including a source of potential, a photoconductive element connected to said source of potential, and an electrode connected to said element; and (e) droplet separating means to separate the distinguishably affected droplets from the others in said trajectory to permit like separated droplets to deposit onto said copy sheet.

2. The system according to claim 1 in which said droplet producing means produces an array of closely spaced substantially parallel trajectories of said ink droplets and said electrode means includes a plurality of individual electrodes each associated with one of said ink trajectories and separately responsive to signals received from said source.

3. The system according to claim 1 including second electrode means supported adjacent to the droplet trajectory upstream from said first recited electrode means to charge all of the droplets in said trajectory to a predetermined level, whereby in subsequent response to said first electrode means selective droplets are distinguishably affected by being deflected away from said trajectory.

4. The system according to claim 1 in which said electrode means distinguishably affects the droplets moving therepast for the duration of the received signals by placing a predetermined charge level thereon and said droplet separating means includes field deflection means adjacent the trajectory path downstream from said electrode means to deflect those droplets charged by said electrode means into a trajectory different than said first trajectory.

5. A system for the recording of intelligence information comprising:

(a) a source of information intelligence;

(b) means to support a copy sheet on which information intelligence from said source is to be recorded;

(c) droplet producing means to produce a steady flow of electrically conductive ink droplets in a trajectory leading generally toward the copy sheet on said support; and, (d) electrode means supported stationary in field relation to the droplets in said trajectory to receive information from said source in the form of radiation signals and in response to a receipt thereof to electrically distinguishably affect the droplets moving therepast for the duration of the received signal, said electrode means including a photoconductive element for receiving said radiation signals, a source of potential connected to said element, and an electrode integral with said element and extending toward said trajectory.

6. A system for the recording of intelligence information comprising:

(a) a source of radiation signals representative of information intelligence;

(b) means to support a copy sheet on which information intelligence from said source is to be recorded;

(c) droplet producing means to emit a steady stream flow of electrically conductive ink which forms droplets in a trajectory leading generally toward the copy sheet on said support;

(d) first electrode means supported stationary adjacent the droplet trajectory to charge all the droplets moving therepast;

(e) second electrode means being radiation responsive and supported stationary adjacent the droplets trajectory downstream from said first electrode means to receive information from said source in the form of said radiation signals and in response thereto to provide an electrical deflection field to deflect those droplets moving therepast for the duration of the received signal into a trajectory different than said first trajectory said second electrode means including a photoconductive element integral with an electrode which extends proximate to said droplet trajectory; and (f) droplet separating means intermediate said second electrode and the copy sheet on said support to separate those droplets deflected by said second electrode means from the other of said droplets to permit like separated droplets in their trajectory to deposit onto said copy sheet.

7. A system for the recording of intelligence information comprising:

(a) a source of information intelligence;

(b) means to support a copy sheet on which information intelligence from said source is to be recorded;

(c) droplet producing means to emit a steady stream flow of electrically conductive ink which forms droplets in a trajectory leading generally toward the copy sheet on said support;

(d) electrode means supported stationary adjacent the droplet trajectory to receive information from said source in the form of radiation signals and in response thereto to electrically charge those droplets moving therepast for the duration of the received signal, said electrode means including a photoconductive element to receive said radiation signals, a source of potential connected to said element, and an electrode integral with said element and extending toward said trajectory;

(e) a pair of spaced-apart deflection plates to receive the passing droplets therebetween after passing said electrode means and to which a potential is connected to effect a deflection field in the trajectory path of said droplets whereby the electrode charged of said droplets are deflected into a trajectory different than the other of said droplets; and (f) droplet separating means intermediate said deflection plates and the copy sheet on said support to separate those droplets deflected as having received a charge from said electrode means from the other of said droplets to permit like separated droplets in their trajectory to deposit onto said copy sheet.

8. The system according to claim 7 in which only the droplets charged by said electrode means deposit onto said copy sheet.

References Cited

UNITED STATES PATENTS

| | | | |
|---|---|---|---|
| 1,817,098 | 8/1931 | Ranger et al. | 178—5.4 |
| 2,577,894 | 12/1951 | Jacob | 346—75 |
| 2,676,868 | 4/1954 | Jacob | 346—75 |
| 3,287,734 | 11/1966 | Kazan | 346—75 X |
| 3,298,030 | 1/1967 | Lewis et al. | 346—75 |
| 2,584,695 | 2/1952 | Good | 178—5.2 |
| 2,600,129 | 6/1952 | Richards | 317—3 |
| 3,369,252 | 2/1968 | Adams | 346—75 |

JOSEPH W. HARTARY, Primary Examiner